United States Patent [19]

VanRens

[11] Patent Number: 5,054,537
[45] Date of Patent: Oct. 8, 1991

[54] LOST FOAM PATTERN ASSEMBLY FOR V-BLOCK ENGINE

[75] Inventor: Russell J. VanRens, Milwaukee, Wis.

[73] Assignee: Outboard Marine Corporation, Waukegan, Ill.

[21] Appl. No.: 636,561

[22] Filed: Jan. 7, 1991

Related U.S. Application Data

[63] Continuation of Ser. No. 202,970, Jun. 3, 1988, abandoned.

[51] Int. Cl.⁵ .............................................. B22C 9/04
[52] U.S. Cl. ........................................ 164/34; 164/45; 164/246; 164/249
[58] Field of Search ....................... 164/34, 35, 36, 45, 164/137, 342, 235, 245, 246, 249, 339, 340; 249/61, 62, 63, 144, 145; 425/DIG. 12, DIG. 58

[56] References Cited

U.S. PATENT DOCUMENTS

| | | | |
|---|---|---|---|
| 3,374,827 | 3/1968 | Schebler | 164/137 |
| 3,727,671 | 4/1973 | Kawai | 164/137 |
| 3,744,468 | 7/1973 | Braun | 123/41.7 |
| 3,889,737 | 6/1975 | Olsen | 164/34 |
| 4,197,899 | 4/1980 | Ernest | 164/45 |
| 4,273,182 | 6/1981 | Winterhalter et al. | 164/137 |
| 4,598,757 | 7/1986 | Bailey | 164/137 |
| 4,609,030 | 9/1986 | Heater et al. | 164/137 |
| 4,632,169 | 12/1986 | Osborn et al. | 164/45 |
| 4,640,333 | 2/1987 | Martin et al. | 164/45 |
| 4,640,728 | 2/1987 | Martin et al. | 164/45 |
| 4,657,063 | 4/1987 | Morris | 164/45 |
| 4,766,942 | 8/1988 | Wessman et al. | 164/34 |

FOREIGN PATENT DOCUMENTS

| | | | |
|---|---|---|---|
| 62-282745 | 12/1987 | Japan | 164/45 |
| 62-282747 | 12/1987 | Japan | 164/45 |

*Primary Examiner*—Richard K. Seidel
*Attorney, Agent, or Firm*—Michael, Best & Friedrich

[57] ABSTRACT

Disclosed herein is a lost foam pattern assembly comprising a crankcase section including first and second planar surfaces intersecting at an angle defined therebetween, a port cylinder section fixed to the first surface of the crankcase section, and a starboard cylinder section fixed to the second surface of the crankcase section, which port and starboard cylinder sections are fixed to each other along a glue face located in a plane bisecting the angle.

34 Claims, 6 Drawing Sheets

LOST FOAM PATTERN ASSEMBLY FOR V-BLOCK ENGINE

RELATED APPLICATIONS

This is a continuation of Ser. No. 202,970, filed June 3, 1988 and now abandoned.

This application is related to my following co-pending applications filed of even date herewith:

Ser. No. 202,876 Filed: June 3, 1988 now U.S. Pat. No. 4,872,637, issued Oct. 10, 1989 Entitled "Die Member For Forming A Lost Foam Pattern"

Ser. No. 202,489 Filed: June 3, 1988 now U.S. Pat. No. 4,880,047, issued Nov. 14, 1989 Entitled "Lost Foam Transfer Passage Cavity Construction"

Ser. No. 202,212 Filed: June 3, 1988 Now Ser. No. 306,245, filed Feb. 2, 1989 Entitled "Lost Foam Engine Block Pattern" now abandoned

BACKGROUND OF THE INVENTION

The invention relates generally to lost foam patterns for use in the lost foam casting process.

More particularly, the invention relates to multi-piece lost foam pattern assemblies for casting multi-cylinder, V-block, two stroke internal combustion engines.

Attention is directed to the following U.S. Pat. Nos.:

| | | |
|---|---|---|
| 3,374,827 | Schebler | March 26, 1968 |
| 3,727,671 | Kawai | April 17, 1973 |
| 3,744,468 | Braun | July 10, 1973 |
| 4,197,899 | Ernest | April 15, 1980 |
| 4,273,182 | Winterhalter, et al. | June 16, 1981 |
| 4,598,757 | Bailey | July 8, 1986 |
| 4,609,030 | Heater, et al. | September 2, 1986 |
| 4,632,169 | Osborn, et al. | December 30,1986 |
| 4,640,333 | Martin, et al. | February 3, 1987 |
| 4,640,728 | Martin, et al. | February 3, 1987 |
| 4,657,063 | Morris | April 14, 1987 |

SUMMARY OF THE INVENTION

The invention provides a lost foam pattern assembly comprising a crankcase section including first and second planar surfaces intersecting at an angle defined therebetween, a port cylinder section fixed to the first surface of the crankcase section, and a starboard cylinder section fixed to the second surface of the crankcase section, which port and starboard cylinder sections are fixed to each other along a glue face located in a plane bisecting said angle.

The invention also provides a lost foam pattern assembly comprising a port crankcase section including first and second surfaces extending at a right angle to each other, and a third surface extending in inclined relation to the first and second surfaces, a starboard crankcase section including first and second surfaces extending at a right angle to each other, and a third surface extending in inclined relation to the first and second surfaces of the starboard crankcase section and fixed to each other along a first glue face, which first surfaces of the port and starboard crankcase sections are co-planar, which second surfaces of the port and starboard crankcase sections are fixed to each other along a first glue face, a port cylinder section fixed to the third surface of the port crankcase section, and a starboard cylinder section fixed to the third surface of the starboard crankcase section, which port and starboard cylinder sections are fixed to each other along a second glue face co-planar with the first glue face.

The invention also provides a lost foam pattern assembly comprising a first piece including first and second surfaces extending at a right angle to each other, and a third surface extending in inclined relation to the first and second surfaces, a second piece including first and second surfaces extending at a right angle to each other and a third surface extending in inclined relation to the first and second surfaces of the second piece, the second surfaces of the first and second pieces being fixed to each other along a first glue line and the first surfaces of the first and second pieces being co-planar, a third piece having a first surface fixed to the third surface of the first piece along a second glue line, and a fourth piece having a first surface fixed to the third surface of the second piece along a third glue line, which second and third glue lines extend at a substantial angle at each other, and which first, second and third glue lines are free of intersection with one another.

The invention also provides a lost foam pattern assembly for a V-block multi-cylinder two stroke internal combustion engine, which pattern comprises a first piece having a first surface, an other surface in inclined relation to the first surface of the first piece, a cylindrical bore extending from the first surface of the first piece, and wall means defining a cavity extending in the first surface in the first piece and communicating with the bore in the first piece and extending to the other surface of the first piece and partially defining a first exhaust passage, a second piece having a first surface, an other surface in inclined relation to the first surface of the second piece and in co-planar relation to the second surface of the first piece, a cylindrical bore extending from the first surface of the second piece, and wall means defining a cavity extending in the first surface of the second piece and communicating with the bore in the second piece and extending to the other surface of the second piece and partially defining a second exhaust passage, a third piece including a first surface fixed to the first surface of the first piece, an other surface extending in inclined relation to the first surface of the third piece and in co-planar relation to the other surfaces of the first and second pieces, a cylindrical bore extending from the first surface of the third piece and in alignment with the cylindrical bore in the first piece, and wall means defining a cavity extending in the first surface of the third piece and communicating with the bore in the third piece and extending to the other surface of the third piece and partially defining the first exhaust passage, a fourth piece including a first surface fixed to the first surface of the second piece, an other surface in inclined relation to the first surface of the fourth piece and in co-planar relation to the other surfaces of the first, second, and third pieces, a cylindrical bore extending from the first surface of the fourth piece and in alignment with the cylindrical bore in the second piece, and wall means defining a cavity extending in the first surface of the fourth piece and communicating with the bore in the fourth piece and extending to the other surface of the fourth piece and partially defining the second exhaust passage, an exhaust manifold piece having a first surface fixed to the other surfaces of the first, second, third, and fourth pieces, and wall means defining a cavity extending in the first surface of the exhaust manifold piece and partially defining the first and second exhaust passages, and a water jacket cover piece having a first surface fixed to the third and fourth pieces, and a cover surface extending from the first surface of the water jacket piece and in spaced and covering relation to the exhaust manifold piece.

The invention also provides a lost foam pattern assembly for a V-block multi-cylinder two stroke internal combustion engine, which pattern comprises a first piece including first and second surfaces extending at a right angle to each other, and a third surface extending in inclined relation to the first and second surfaces, a second piece including first and second surfaces extending at a right angle to each other and a third surface extending in inclined relation to the first and second surfaces of the second piece, the second surfaces of the first and second pieces being fixed to each other and the first surfaces of the first and second pieces being co-planar, a third piece fixed to the first piece and having a first surface in parallel relation to the third surface of the first piece, an other surface in inclined relation to the first surface of the third piece, a cylindrical bore extending from the first surface of the third piece, and wall means defining a cavity extending in the first surface in the third piece, communicating with the bore in the third piece, extending to the other surface of the third piece, and partially defining a first exhaust passage, a fourth piece fixed to the second piece and having a first surface in parallel relation to the third surface of the second piece, an other surface in inclined relation to the first surface of the second piece and co-planar with the other surface of the third piece, a cylindrical bore extending from the first surface of the fourth piece, and wall means defining a cavity extending in the first surface of the fourth piece, communicating with the bore in the fourth piece, extending to the other surface of the fourth piece, and partially defining a second exhaust passage, a fifth piece including a first surface fixed to the first surface of the third piece, an other surface in inclined relation to the first surface of the first piece and in co-planar relation to the other surfaces of the third and fourth pieces, a cylindrical bore extending from the first surface of the fifth piece and in alignment with the cylindrical bore in the third piece, and wall means defining a cavity extending in the first surface of the fifth piece, communicating with the bore in the fifth piece, extending to the other surface of the fifth piece, and partially defining the first exhaust passage, a sixth piece including a first surface fixed to the first surface of the fourth piece, an other surface in inclined relation to the first surface of the second piece and in co-planar relation to the other surfaces of the third, fourth, and fifth pieces, a cylindrical bore extending from the first surface of the sixth piece and in alignment with the cylindrical bore in the fourth piece, and wall means defining a cavity extending in the first surface of the sixth piece, communicating with the bore in the sixth piece, extending to the other surface of the sixth piece, and partially defining the second exhaust passage, an exhaust manifold piece having a first surface fixed to the other surfaces of the third, fourth, fifth, and sixth pieces, and wall means defining a cavity extending in the first surface of the exhaust manifold piece and partially defining the first and second exhaust passages, and a water jacket cover piece having a first surface fixed to the fifth and sixth pieces, and a cover surface extending from the first surface of the water jacket piece and in spaced and covering relation to the exhaust manifold piece.

The invention also provides a lost foam pattern assembly for a V-block multi-cylinder two stroke internal combustion engine, which pattern comprises a port crankcase section including first and second surfaces extending at a right angle to each other, and a third surface extending in inclined relation to the first and second surfaces, a starboard crankcase section including first and second surfaces extending at a right angle to each other and a third surface extending in inclined relation to the first and second surfaces of the starboard crankcase section, the second surfaces of the port and starboard crankcase sections being fixed to each other and the first surfaces of the port and starboard crankcase sections being co-planar, a port lower cylinder section having a first surface fixed to the third surface of the port crankcase section, a second surface in spaced and parallel relation to the first surface of the port lower cylinder section, and a cylindrical bore extending between the first and second surfaces of the port lower cylinder section, a starboard lower cylinder section having a first surface fixed to the third surface of the starboard crankcase section, a second surface in spaced parallel relation to the first surface of the starboard lower cylinder section, and a cylindrical bore extending between the first and second surfaces of the starboard lower cylinder section, a port middle cylinder section having a first surface fixed to the second surface of the port lower cylinder section, a second surface in spaced parallel relation to the first surface of the port middle cylinder section, a third surface in inclined relation to the second surface of the port middle cylinder section, a cylindrical bore extending between the first and second surfaces of the port middle cylinder section and in alignment with the cylindrical bore in the port lower cylinder section, and wall means defining a cavity extending in the second surface in the port middle cylinder section and communicating with the bore in the port middle cylinder section and extending to the third surface of the port middle cylinder section and partially defining a first exhaust passage, a starboard middle cylinder section having a first surface fixed to the second surface of the starboard lower cylinder section, a second surface in spaced parallel relation to the first surface of the starboard middle cylinder section, a third surface in inclined relation to the second surface of the starboard middle cylinder section and co-planar with the third surface of the port middle cylinder section, a cylindrical bore extending between the first and second surfaces of the starboard middle cylinder section and in alignment with the bore in the starboard lower cylinder section, and wall means defining a cavity extending in the second surface of the starboard middle cylinder section and communicating with the bore in the starboard middle cylinder section and extending to the third surface of the starboard middle cylinder section and partially defining a second exhaust passage, a port upper cylinder section including a first surface fixed to the second surface of the port middle cylinder section, a second surface in spaced parallel relation to the first surface of the port upper cylinder section, a third surface in inclined relation to the second surface of the port upper cylinder section and in co-planar relation to the third surfaces of the port and starboard middle cylinder sections, a cylindrical bore extending between the first and second surfaces of the port upper cylinder section and in alignment with the cylindrical bore in the port middle cylinder section, and wall means defining a cavity extending in the first surface of the Port upper cylinder section and communicating with the bore in the port upper cylinder section and extending to the third surface of the port upper cylinder section and partially defining the first exhaust passage, a starboard upper cylinder section including a first surface fixed to the second surface of the starboard middle cylinder section, a second surface in spaced parallel relation to the first surface of the starboard upper cylinder section, a third surface in inclined relation to the second surface of the starboard upper cylinder section and in co-planar relation to the third surfaces of the port and starboard middle cylinder sections and the port upper cylinder section, a cylindrical bore extending between the first and second surfaces of the starboard upper cylinder section and in alignment with the cylindrical bore in the starboard middle cylinder section, and wall means defining a cavity extending in the first surface of the starboard upper cylinder section and communicating with the bore in the starboard upper cylinder section and extending to the third surface of the starboard upper cylinder section and partially defining the second exhaust passage, an exhaust manifold section having a first surface fixed to the third surfaces of the port and starboard middle and upper cylinder sections, and wall means defining a cavity extending in the first surface of the exhaust manifold section and partially defining the first and second exhaust passages, and a water jacket cover section having a first surface fixed to the port and starboard upper cylinder sections, and a cover surface extending from the first surface of the water jacket section and in spaced and covering relation to the exhaust manifold section.

The invention also provides a lost foam pattern assembly comprising a first piece including a planar surface, a cylindrical bore extending from the planar surface, and a first cavity communicating with the cylindrical bore and with the first planar surface, and a second piece including a planar surface fixed to the planar surface of the first piece, a cylindrical bore extending from the planar surface of the second piece and in registry with the cylindrical bore of the first piece, a cavity communicating with the cylindrical bore of the second piece and with the planar surface of the second piece and in registry with the cavity of the first piece, and another cavity having an end in spaced relation to the planar surface of the second piece, communicating with the cylindrical bore of said second piece, and extending from the end in the direction away from the first piece.

Various of the features and advantages of the invention will become apparent to those skilled in the art upon review of the following detailed description, claims, and drawings

DESCRIPTION OF THE DRAWINGS

FIG. 19 is a view similar to FIG. 2 illustrating a second embodiment of the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Shown in the drawings is an end view of a lost foam pattern assembly 11 for casting, in the lost foam process, a multiple cylinder V-block two stroke engine (not shown). While other V-block arrangements could be employed, in the disclosed construction, the angle of the V is 90° and the number of cylinders in each bank is two, thereby providing a total of four cylinders.

As shown in the drawings, the lost foam pattern assembly 11 includes (see FIG. 1) a front crankcase face 13 to which, in the resulting cast engine block, a crankcase cover (not shown) is attached. The lost foam pattern assembly 11 also includes a bottom end 17 including an exhaust outlet or port 19, and a pair of coolant inlet ports 21 and 23 which are L-shaped and extend to the side and rear of the exhaust outlet 19. In addition, the bottom end 17 includes a pair of coolant drain ports 25 and 27. Centrally thereof, the bottom end 17 also includes a central opening 29.

The lost foam pattern assembly 11 also includes (see FIG. 2) a top end 31 having a central, generally rectangular access opening or port 33. In addition, the lost foam pattern assembly 11 includes (see FIG. 3) a rear face 35, a pair of cylinder head faces 37 and 39 to which, in the resulting cast engine block, a pair of cylinder heads (not shown) are attached, and (see FIG. 1) a pair of exterior side faces 41 and 43 having portions extending between the cylinder head faces 37 and 39 and the rear face 31 and portion extending between the cylinder head faces 37 and 39 and the front face 13. The cylinder head faces 37 and 39 respectively include coolant drain ports 38 and 40.

The lost foam pattern assembly 11 also includes a pair of cylinders 51 and 53 (see FIG. 3) which are located in a first or port bank 55 and extend from the cylinder head face 37 and which are provided with exhaust ports communicating with a first exhaust passage 57 extending to the exhaust outlet 19. The lost foam pattern assembly 11 also includes cylinders 61 and 63 (see FIG. 11) which are located in a second or starboard bank 65 and extend from the cylinder head face 39 and which are provided with exhaust ports which communicate with a second exhaust passage 67 extending to the exhaust outlet 19. Interiorly, the lost foam pattern assembly 11 is provided with a cavity or water jacket space 71 which, in general, surrounds the cylinders 51, 53, 61 and 63 and exhaust passages 57 and 67 and communicates with the coolant inlet ports 21 and 23 and with the coolant drain ports 25 and 27.

The lost form pattern assembly 11 comprises ten major pieces and eight additional inserts or pieces which are glued together to form the pattern assembly 11. All of the pieces are formed of plastic foam material and all are designed to facilitate die casting thereof by conventional means.

Figure 1:
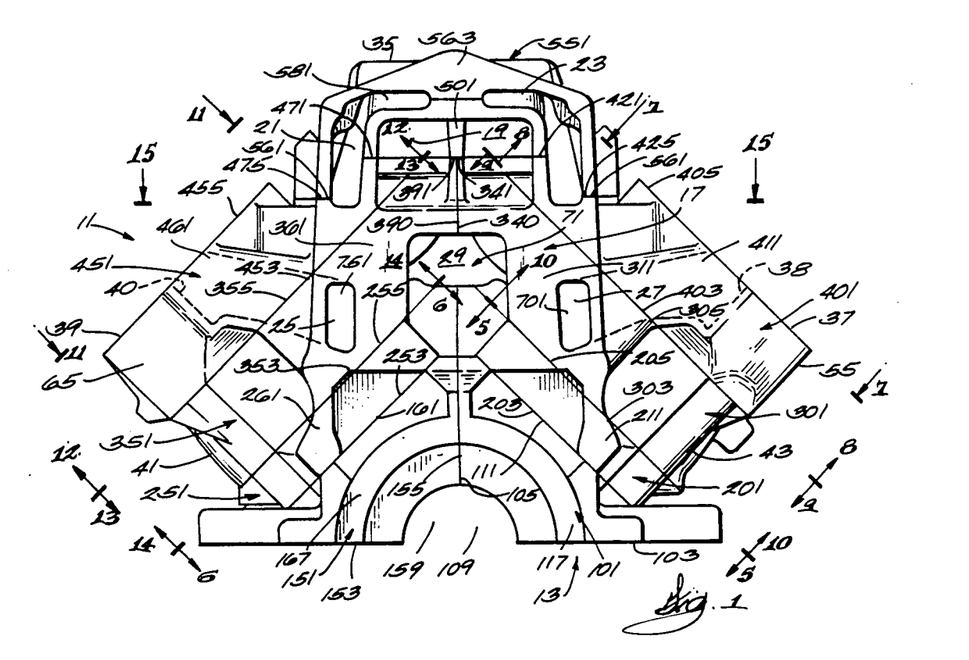
FIG. 1 is a bottom view of a lost foam pattern assembly incorporating various of the features of the invention.
Figure 2:
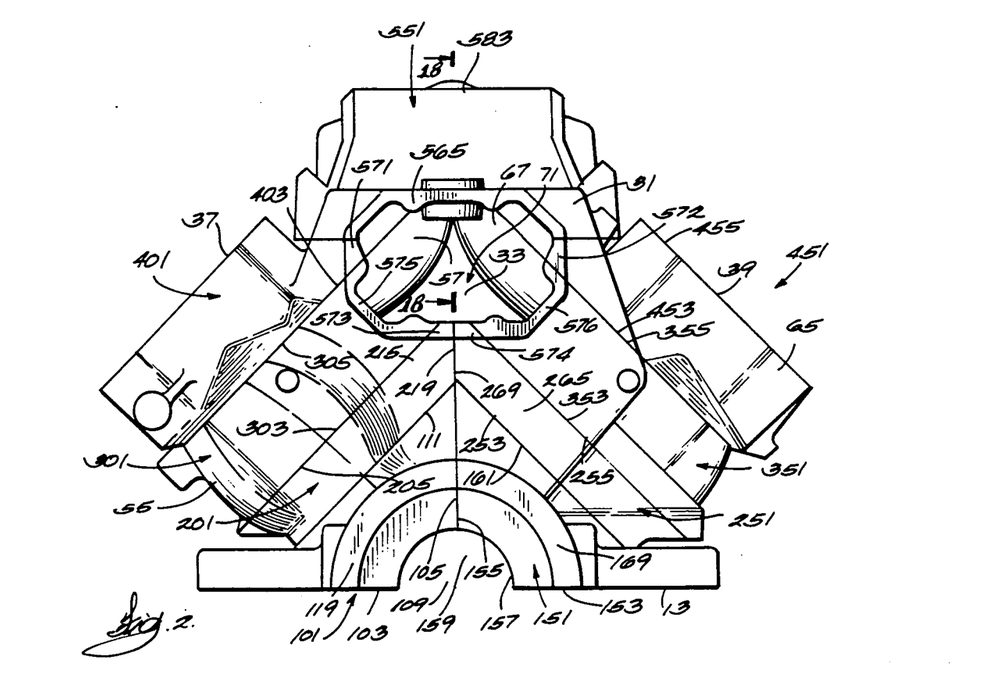
FIG. 2 is a top view of the lost foam pattern assembly shown in FIG. 1.
Figure 3:
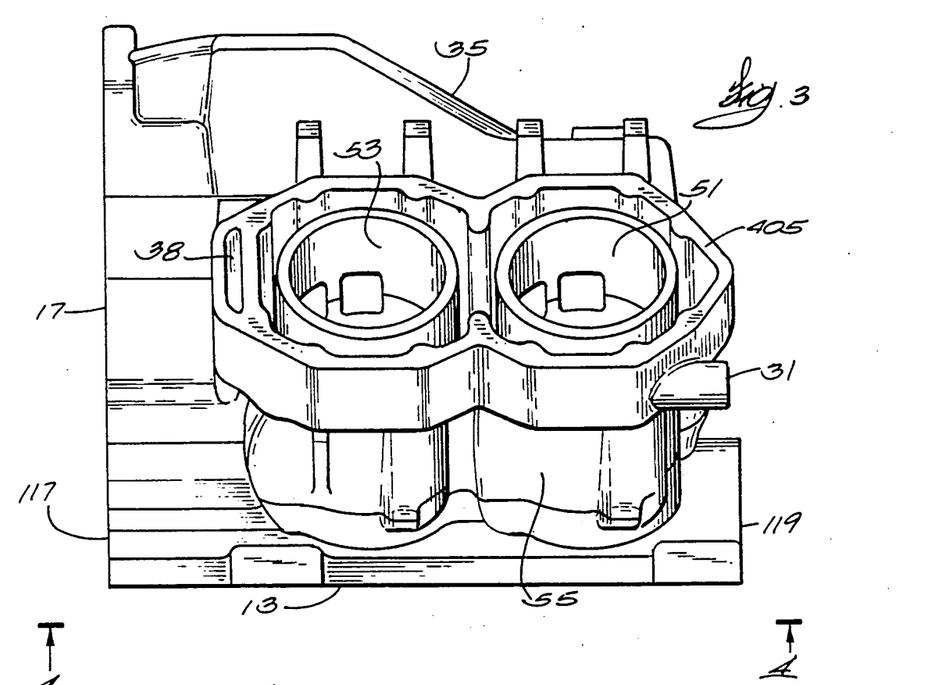
FIG. 3 is a side view of the lost foam pattern assembly shown in FIGS. 1 and 2 with the bottom to the left and with the top to the right.
Figure 4:
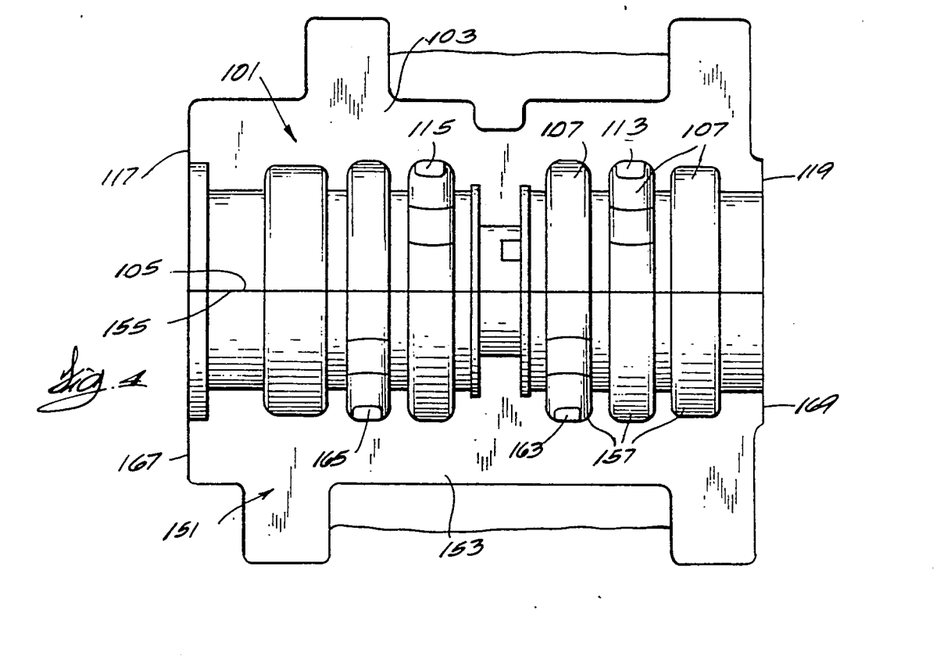
FIG. 4 is a fragmentary view taken along line 4—4 of FIG. 3.

The first piece 101 comprises a port crankcase section or piece and includes, as shown in FIGS. 1, 2 and 4, a first planar surface 103 which forms part of the front crankcase face 13, together with a second planar surface 105 which extends at a right angle to the first planar surface 103. The first and second planar surfaces 103 and 105 are connected by a series of curved surfaces 107 which form a cavity 109 providing a partial crankcase chamber.

The other side of the first piece or port crankcase section 101 includes a third planar surface 111 which extends at an incline to the first and second surfaces 103 and 105. While other angles could be employed, in the disclosed construction, the third surface 111 extends at an angle of 45° to each of the first and second surfaces 103 and 105.

Extending between the third surface 111 and the curved crankcase surface 107 are (see FIGS. 4 and 5) first and elongated slots 113 and 115 which, in the resulting casting, provide first and second openings for the passage of associated connecting rods (not shown).

The first piece or port crankcase section 101 also includes (see FIG. 4) opposite or bottom and top end surfaces 117 and 119.

The lost foam pattern assembly 11 further includes a second or starboard quarter crankcase section or piece 151 which is similar to the first piece 101 and includes, as shown in FIGS. 1 and 2, a first planar surface 153 which forms part of the front or crankcase face 13, together with a second planar face 155 which extends at a right angle to the first planar surface 153. The first and second planar surfaces 153 and 155 are connected by a series of curved surfaces 157 which form a cavity 159 partially forming the internal wall of the resulting crankcase chamber. The second surfaces 105 and 155 are glued or otherwise suitably attached to each other.

The other side of the second piece or starboard crankcase section 151 includes (see FIGS. 1 and 2) a third planar surface 161 which extends at an incline to the first and second surfaces 153 and 155. While other angles could be employed, in the disclosed construction, the third surface 161 extends at an angle of 45° to each of the first and second surfaces 153 and 155.

Extending between the third surface 161 and the curved crankcase surface 157 are (see FIGS. 4 and 6) first and elongated slots 163 and 165 which, in the resulting casting, provide first and second openings for the passage of associated connecting rods (not shown). The elongated slots 163 and 165 in the second piece 151 are offset axially of the the length of the crankcase with respect to the elongated slots 113 and 115 in the first piece 101.

Figure 6:
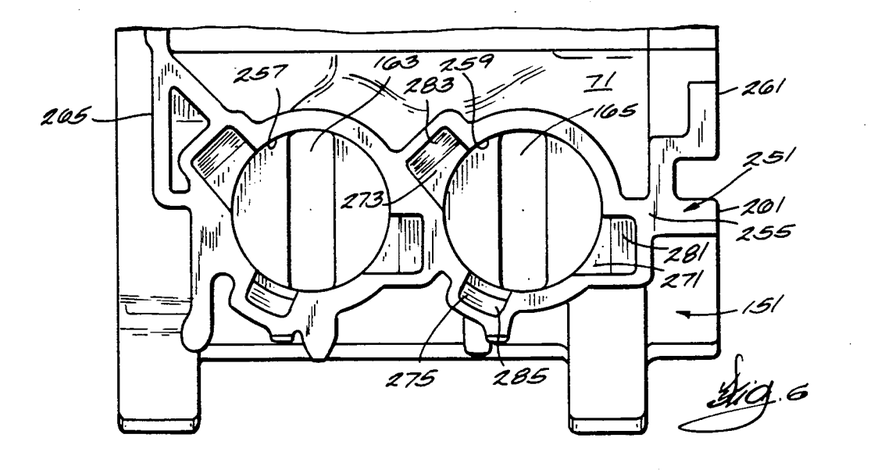
FIG. 6 is a fragmentary view taken along line 6—6 cf FIG. 1.

The second piece or starboard crankcase section 151 also includes opposite or bottom and top end surfaces 167 and 169.

The lost foam pattern assembly 11 also includes (see FIGS. 1, 2 and 5) a third piece or port lower cylinder section 201 which includes a first planar surface 203 which is glued or otherwise suitable attached to the third planar surface 111 of the first piece 101. In addition, the third piece or port lower cylinder section 201 includes a second planar surface 205 which is spaced from and parallel to the first planar surface 201.

Figure 5:
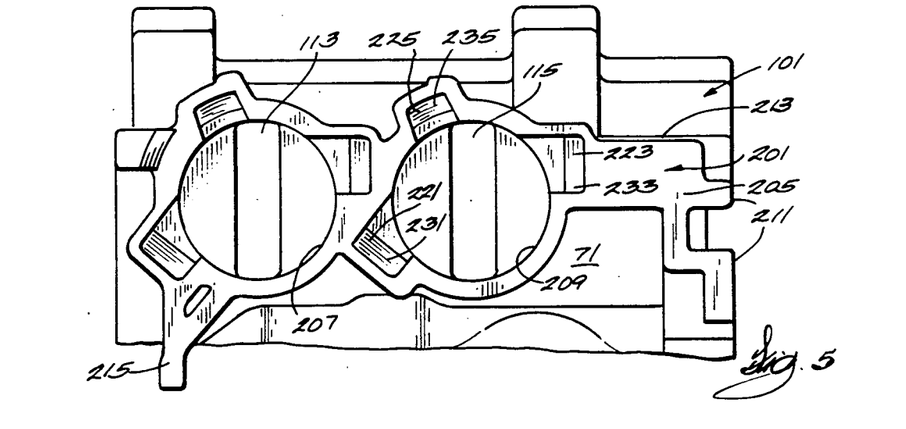
FIG. 5 is a fragmentary view taken along line 5—5 of FIG. 1.

Extending between the first and second planar surfaces 203 and 205 of the third piece or port lower cylinder section 201 are wall means defining first and second cylindrical bores 207 and 209 which are respectively aligned with the first and second elongated slots 113 and 115 in the first piece 101, and which form portions of the cylinders 51 and 53.

The third piece or port lower cylinder section 201 also includes a bottom end wall 211 which extends between the first and second surfaces 203 and 205 and from a side wall 213 which extends in the direction of the length of the crankcase from the wall means defining the cylindrical bores 207 and 209, and to the bottom end wall 211.

The third piece or port lower cylinder section 201 also includes a top end wall 215 which extends between the first and second surfaces and which is provided (see FIG. 2) with a surface 219 extending in coplanar relation to the second surface 105 of the first piece 101.

The bottom end wall 211, the side wall 213, and the top end wall 215 cooperate with the wall means defining the cylindrical bores 207 and 209, together with wall portions of the first piece 101, to define portions of the water jacket space 71.

In addition, the third piece or port lower cylinder section 201 also includes, for each of the cylindrical bores 207 and 209 (see FIG. 5) a series of cavities 221, 223, and 225 which respectively form a crankcase end portion of a pair of transfer passages 231 and 233 and a crankcase end portion of a boost transfer passage 235. The transfer passages 231 and 233 are angularly spaced from each other at an angle which is known in loop scavenged two-stroke, internal combustion engine design. It is noted that the cavities 221, 223 and 225 increase in size in the direction toward the second planar surface 205 to enable separation of the third piece 201 and a forming die (not shown).

The lost foam pattern assembly 11 also includes (see FIGS. 1, 2 and 6) a fourth piece or starboard lower cylinder section 251 which includes a first planar surface 253 which is glued or otherwise fixed to the third planar surface 161 of the second piece 151. In addition, the fourth piece or starboard lower cylinder section 251 includes a second planar surface 255 which is spaced from and parallel to the first planar surface 253. The fourth piece or starboard lower cylinder section 251 also includes wall means defining first and second cylindrical bores 257 and 259 which are generally aligned with the first and second elongated slots 163 and 165 in the second piece 151, and which form portions of the cylinders 61 and 63.

The fourth piece or starboard lower cylinder section 251 also includes a bottom wall 261 which extends between the first and second surfaces 253 and 255 and from the wall means defining the cylindrical bores 257 and 259.

The fourth piece or starboard lower cylinder section also includes a top end wall 265 which extends between the surfaces 253 and 255 and which is provided (see FIG. 2) with a surface 269 which extends in coplanar relation to the second surface 155 of the second piece 151 and which is glued or otherwise fixed to the surface 219 of the third piece 201.

The bottom end wall 261 and the top end wall 265 cooperate with the wall means defining the cylindrical bore 257 and 259, together with wall portions of the second piece 151, to define portions of the water jacket space 71.

In addition, each of the cylindrical bores 257 and 259 of the fourth piece or starboard lower cylinder section 251 includes a series of cavities 271, 273 and 275 defining a crankcase end portion of first and second transfer passages 281 and 283 and a crankcase end portion of a boost transfer passage 285 as generally described with respect to the third piece 201. It is noted that the cavities 271, 273, and 275 increase in size toward the second planar surface 255 to enable separation of the fourth piece 251 and a forming die (not shown).

The lost foam pattern assembly 11 also includes (see FIGS. 1, 2, 9 and 10) a fifth piece or port middle cylinder section 301 which includes (see FIG. 10) a first planar surface 303 which is glued or otherwise affixed to the second planar surface 205 of the third piece 201. In addition, the fifth piece or port middle cylinder section 301 also includes (see FIG. 9) a second planar surface 305 which extends in parallel and spaced relation to the first planar surface 303. Still further, the fifth piece or port middle cylinder section 301 is provided with wall means forming first and second cylindrical bores 307 and 309 which are aligned with the first and second cylindrical bores 207 and 209 in the third piece 201 and which form portions of the cylinders 51 and 53.

The fifth piece or port middle cylinder section 301 also includes (see FIGS. 9 and 10) a bottom end wall 311 which extends between the first and second surfaces 303 and 305 and in general alignment with the bottom end wall 211 of the third piece 201 and from a side wall 313 which extends between the bottom end wall 311 and the wall means defining the cylindrical bores 307 and 309 and which is aligned or in register with the side wall 213 of the third piece 201.

The fifth piece or port middle cylinder section 301 also includes (see FIGS. 9 and 10) a top end wall 315 which extends from the wall means defining the cylindrical bores 307 and 309 and between the first and second surfaces 303 and 305 and in general alignment with the top end wall 215 of the third piece 201.

Figure 9:
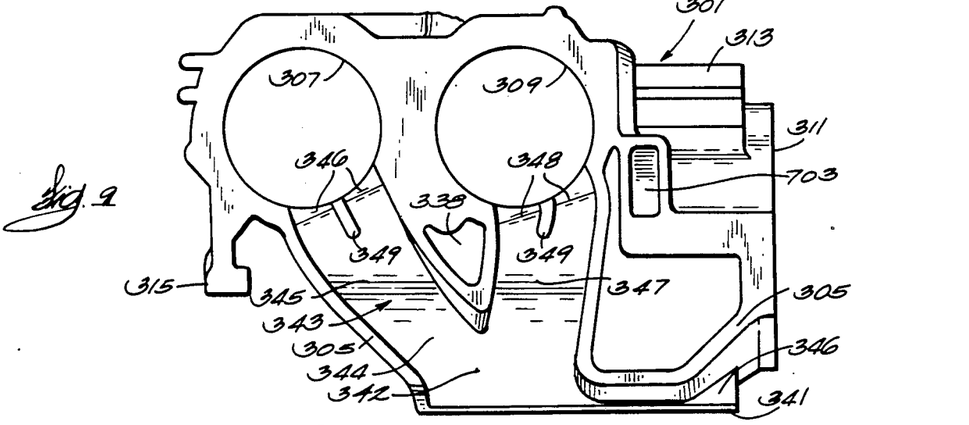
FIG. 9 is a view taken along line 9—9 of FIG. 1.
Figure 10:
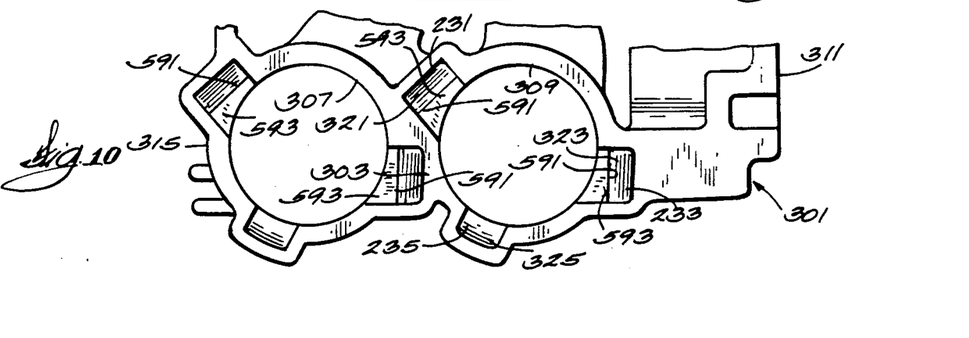
FIG. 10 is a fragmentary view taken along line 10—10 of FIG. 1.

The cylindrical walls of the first and second bores 307 and 309 are provided with recesses or cavities 321, 323 and 325 which provide the head end portions of the first and second transfer passages 231 and 233 and the first boost transfer passage, 235 respectively. The cavities or recesses 321, 323 and 325 which complete the transfer passages 231, 233 and 235 extend from a location in slightly spaced relation from the second surface 305 and toward the first surface 303 and increase in size toward the first surface 303 to facilitate separation of the fifth piece 301 from a forming die (not shown). In other words, the last portion of the first and second cylinder bores 307 and 309, adjacent the second surface 305 is uninterrupted by the transfer passages 231, 233 and 235.

Figure 15:
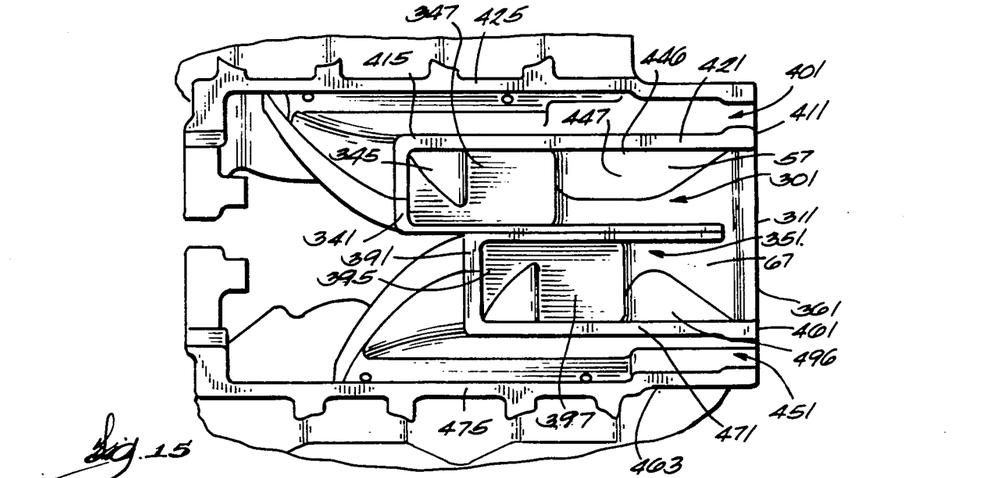
FIG. 15 is a fragmentary view taken along line 15—15 of FIG. 1.
Figure 16:
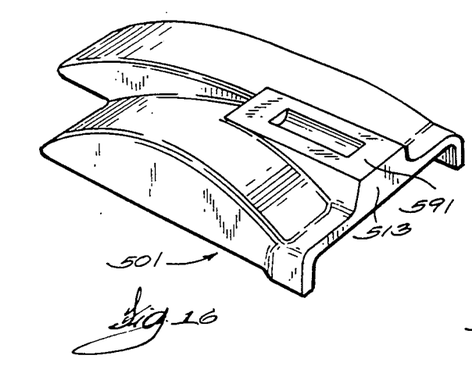
FIG. 16 is a top perspective view of the exhaust manifold piece included in the lost foam pattern assembly shown in FIG. 1.
Figure 17:
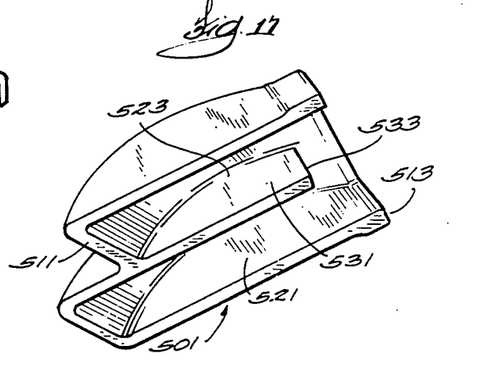
FIG. 17 is a bottom perspective view of the exhaust manifold piece included in the lost foam pattern assembly shown in FIG. 1.

The fifth piece or port middle cylinder section 301 also includes (see FIGS. 9 and 15) a third planar surface 341 which intersects the second planar surface 305 and extends in inclined relation thereto and in generally parallel relation to the first surfaces 103 and 153 of the first and second pieces 101 and 151.

The fifth piece or port middle cylinder section 305 also includes (see FIG. 1) a fourth or additional planar surface 340 which extends perpendicularly from the third planar surface 341 in coplanar relation to the second surface 155 of the second piece 151.

The fifth piece or port middle cylinder section 301 also includes (see FIG. 9) wall means defining a cavity 343 formed in the second planar surface 305 and extending between the first and second cylindrical bores 307 and 309, and the third planar surface 341 to provide an exhaust passage wall 344 partially defining the exhaust passage 57. The cavity 343 includes a first branch 345 extending from the first cylindrical bore 307 and a second branch 347 extending from the second cylindrical bore 309. The first and second branches 345 and 347 communicate respectively with the first and second cylindrical bores 307 and 309 through respective exhaust ports 346 and 348 which are each divided into sub-ports by respective separators or partitions 349.

The cross sections of the exhaust ports 346 and 348 and of the cavity 343 in the fifth piece 301 increase in size toward the second surface 305 to facilitate separation of the fifth piece 301 and a forming die (not shown).

At their other ends, the branches 345 and 347 merge into a common branch 342 which extends to the third surface 341 and which is also defined by a wall portion 346 extending to the bottom end wall 311.

If desired, the exhaust passage wall 344 can also be formed to provide an opening 338 between the cavity branches 345 and 347 forming another portion of the water jacket space 71.

The lost foam pattern assembly 11 also includes (see FIGS. 1, 2, 13 and 14) a sixth piece or starboard middle cylinder section 351 which is similar to the fifth piece or port middle cylinder section 301 and which includes a first planar surface 353 which is glued or otherwise affixed to the second planar surface 253 of the fourth piece or starboard middle cylinder section 251. The sixth piece or starboard middle cylinder section 351 also includes a second planar surface 355 which is spaced from and parallel to the first planar surface 353. In addition, the sixth piece or starboard middle cylinder section 351 includes wall means defining first and second cylindrical bores 357 and 359 which are respectively aligned with the cylindrical bores 257 and 259 in the fourth piece 251 and which form portions of the cylinders 61 and 63 (see FIG. 11).

Figure 13:
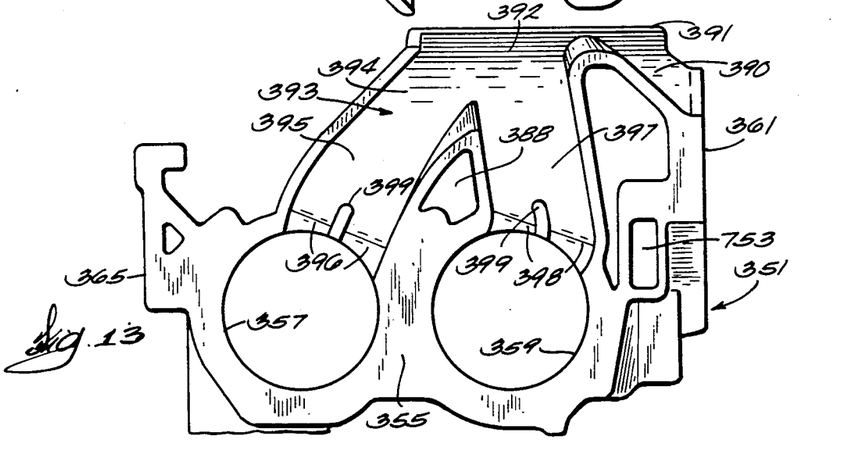
FIG. 13 is a view taken along line 13—13 of FIG. 1.
Figure 14:
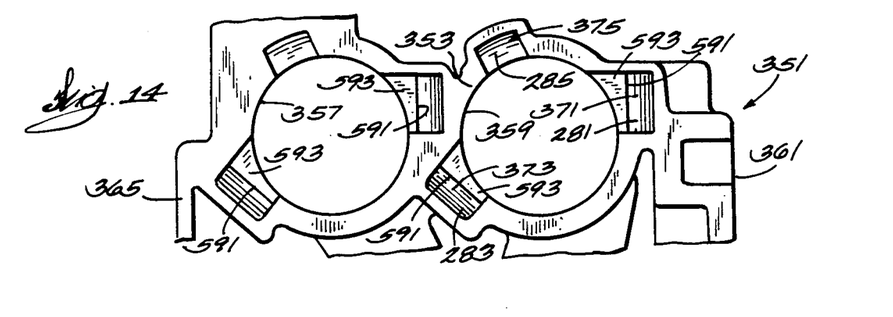
FIG. 14 is a fragmentary view taken along line 14—14 of FIG. 1.

The sixth piece or starboard middle cylinder section 351 also includes a bottom end wall 361 which extends between the first and second surfaces 353 and 355 and from the wall means defining the cylindrical bores 357 and 359 and in general alignment with the bottom end wall 261 of the fourth piece 351.

The sixth piece or starboard middle cylinder section 351 also includes (see FIGS. 13 and 14) a top end wall 365 which extends from the wall means defining the cylindrical bores 357 and 359 and between the first and second surfaces 353 and 355 and in general alignment with the top end wall 265 of the fourth piece 251.

The cylindrical walls of the first and second bores 357 and 359 are provided with recesses or cavities 371, 373 and 375 which provide the head end portions of the first and second transfer passages 281 and 283 and the first boost transfer passage, 285 respectively. The cavities or recesses 371, 373 and 375 which complete the transfer passages 281, 283 and 285 extend from a location in slightly spaced relation from the second surface 355 and toward the first surface 353 and increase in size toward the first surface 353 to facilitate separation of the sixth piece 351 from a forming die (not shown). In other words, the last portion of the first and second cylinder bores 357 and 359, adjacent the second surface 355 is uninterrupted by the transfer passages 281, 283 and 285.

The sixth piece or starboard middle cylinder section 351 also includes (see FIGS. 13 and 15) a third planar surface 391 which intersects the second planar surface 355 and extends in inclined relation thereto and in generally coplanar relation to the third surface 341 of the fifth piece 301 and in generally parallel relation to the first surfaces 103 and 153 of the first and second pieces 101 and 151.

The sixth piece or starboard middle cylinder section 351 also includes (see FIG. 1) a fourth or additional planar surface 390 which extends perpendicularly from the third planar surface 391 incoplanar relation to the second surface 155 the second piece or starboard crankcase section 151 and which is glued to the fourth or additional wall 340 of the fifth piece or port middle cylinder section 301.

The sixth piece or starboard middle cylinder section 351 also includes wall means forming a cavity 393 in the second planar surface 355, and extending between the third surface 391 and the cylindrical bores 357 and 359, to provide an exhaust passage wall 394 partially defining the exhaust passage 67. The cavity 393 including a pair of branches 395 and 397 which communicate respectively with the first and second bores 357 and 359 through exhaust ports 396 and 398 and which are subdivided by respective separators or partitions 399.

The cross sections of the exhaust ports 396 and 398 and of the cavity 393 in the sixth piece or starboard middle cylinder section 351 increase in size toward the second surface 355 to facilitate separation of the sixth piece 351 and a forming die (not shown).

At their other ends, the branches 395 and 397 merge into a common branch 392 which extends to the third surface 391 and which is also defined by a wall portion 390 extending to the bottom end wall 361.

If desired, the exhaust passage wall 394 can be formed to provide an aperture 388 between the cavity branches to 395 and 397 to provide still another portion of the water jacket space 71.

The lost foam pattern assembly 11 also includes (see FIGS. 1, 2, 7 and 8) a seventh piece or port upper cylinder section 401 including a first planar surface 403 which is glued for otherwise suitably fixed to the second surface 305 of the fifth piece or port middle cylinder section 301. In addition, the seventh piece or port upper cylinder section 401 includes a second generally planar surface 405 which is spaced from and parallel to the first surface 403, and which provides the cylinder head face 37. Extending between the first and second surfaces 403 and 405 are wall means defining first and second cylindrical bores 407 and 409 which are respectively aligned with the first and second cylindrical bores 307 and 309 in the fifth piece 301, and which form portions of the cylinders 51 and 53.

The seventh piece or port upper cylinder section 401 also includes (see FIGS. 7 and 8) a bottom end wall 411 which extends from the first surface 403 in general alignment with the bottom end wall 311 of the fifth piece or port middle cylinder section 301 and from a side wall 413 which extends between the bottom end wall and the wall means defining the cylinder bores 407 and 409 and which is aligned or in registry with the side wall 313 of the fifth piece or port middle cylinder section 301.

The seventh piece or port upper cylinder section 401 also includes (see FIGS. 7 and 8) a top end wall 415 which extends from the wall means defining the cylindrical bores 407 and 409 and from the first surface 403 in general alignment with the top end wall 315 of the fifth piece 301.

Figure 7:
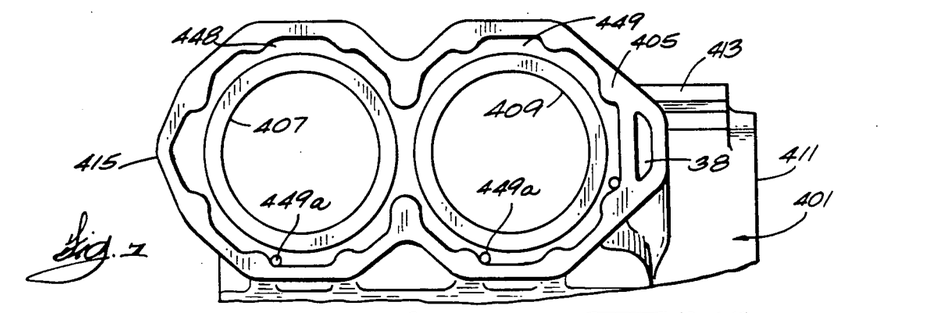
FIG. 7 is a fragmentary view taken along line 7—7 of FIG. 1.
Figure 8:
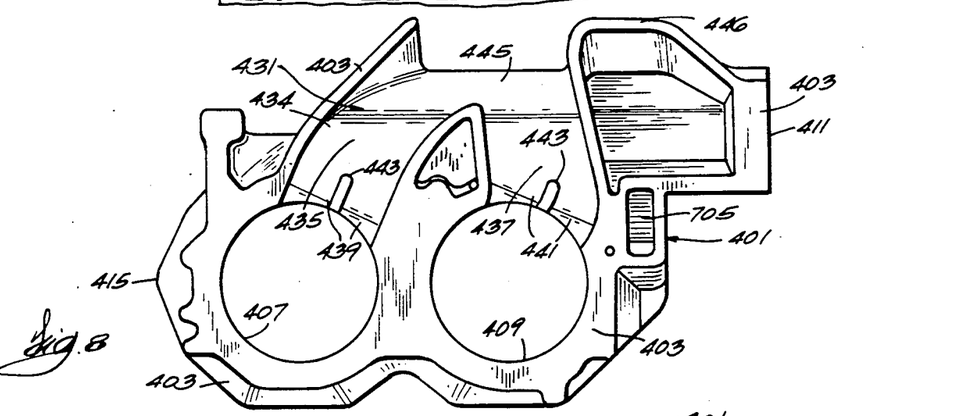
FIG. 8 is a view taken along line 8—8 of FIG. 1.

The seventh piece or port upper cylinder section 401 also includes a third surface 421 which, in the completed assembly, extends in parallel relation to the surfaces 103 and 153 of the first and second pieces 101 and 151 and in co-planar relation to the third surface 341 of the fifth piece 301.

Still further in addition, the seventh piece or port upper cylinder section 401 includes (see FIGS. 1 and 15) a fourth or additional surface 425 located on the exterior of the seventh piece 401 and between the third surface 421 and the second surface 405 and extending in parallel relation to the third surface 421.

The seventh piece or port upper cylinder section 401 also includes (see FIG. 8) a cavity 431 which extends inwardly from the first surface 403 and between the wall means defining the cylinder bores 407 and 409 and the third surface 421 and in registry with the cavity 343 provided in the fifth piece 301 and which provides an exhaust passage wall 434 which defines the remaining portion of the exhaust passage 57.

The cavity 431 includes two branches 435 and 437 respectively communicating at one end with the first and second cylindrical bores 407 and 409 through respective exhaust ports 439 and 441 divided into two sub-ports by respective spliter walls or partitions 443.

At their other ends, the branches 435 and 437 merge into a common branch 445 which extends to the third surface 421 and which is also defined by a wall portion 446 extending to the bottom end wall 411.

The cross sections of the the exhaust ports 439 and 441 and of the cavity 431 in the seventh piece 401 increase in size toward the first surface 403 to facilitate separation of the seventh piece or port upper cylinder section 401 and a forming die (not shown).

The top end wall 415 and the outer side of the exhaust passage wall 434 form a portion of the water jacket space 71 which can be referred to as an exhaust manifold water jacket portion and which extends to and opens into the bottom end wall 411.

The wall means defining the cylinder bores 407 and 409 also defines a pair of circular cavities 448 and 449 which respectively surround the cylindrical bores 407 and 409, which form portions of the water jacket space 71, and which communicate, through ports 449a extending parallel to the axis of the cylindrical bores 407 and 409, with portions of the water jacket space 71 formed by the fifth piece 301. The circular cavities 448 and 449 increase in size toward the second surface 405 to facilitate separation of the seventh piece 401 and a forming die (not shown).

The lost foam pattern assembly 11 also includes an eighth piece or starboard upper cylinder section 451 which is similar to the seventh piece or port upper cylinder section 401 and which includes (see FIGS. 1, 2, 11 and 12) a first planar surface 453 which is glued or otherwise suitably fixed to the second surface 355 of the sixth piece or starboard middle cylinder section 351. In addition, the eighth piece or starboard upper cylinder section 451 includes a second planar surface 455 which is spaced from and in parallel relation to the first surface 453 and which forms the cylinder head face 39.

Figure 11:
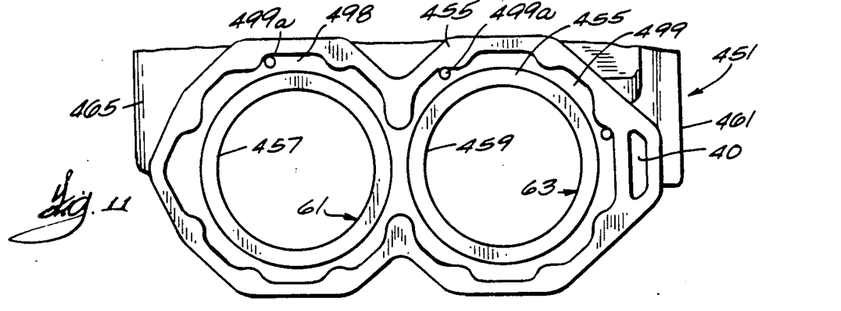
FIG. 11 is a fragmentary view taken along line 11—11 of FIG. 1.
Figure 12:
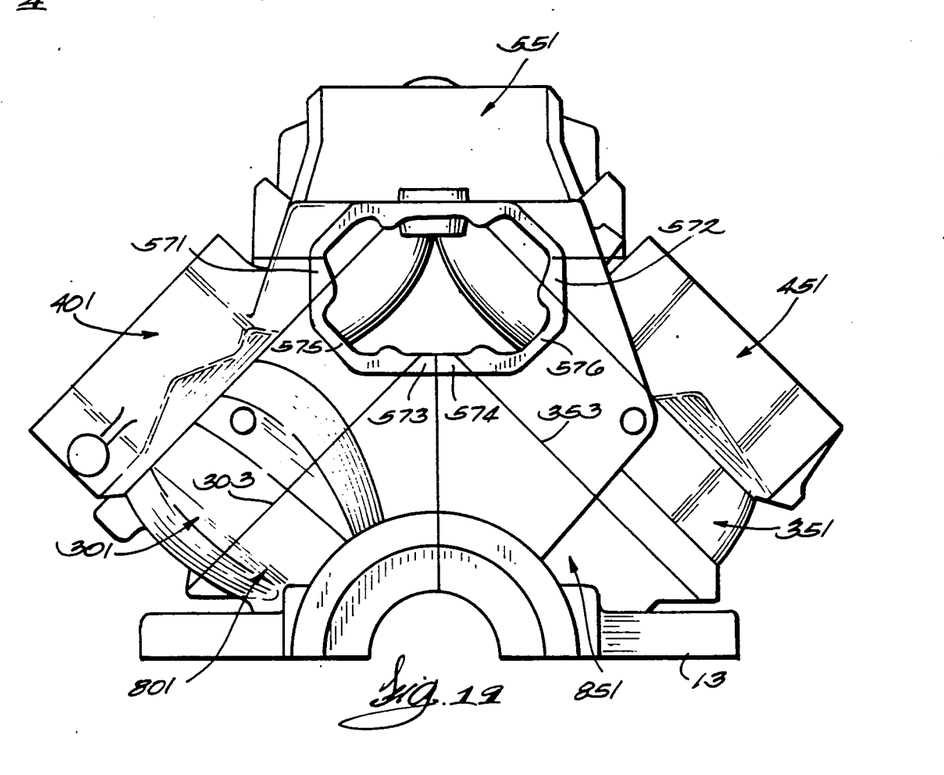
FIG. 12 is a view taken along line 12—12 of FIG. 1.

The eighth piece or starboard upper cylinder section 451 also includes wall means defining first and second cylindrical bores 457 and 459 which extend between the first and second surfaces 453 and 455 in alignment with the first and second bores 357 and 359 in the sixth piece or starboard middle cylinder section 351 which form portions of the cylinders 61 and 63.

The eighth piece or starboard upper cylinder section 451 also includes a bottom end wall 461 which extends from the first surface 453 and from the wall means defining the cylindrical bores 457 and 459 and in general alignment with the bottom end wall 361 of the sixth piece 351.

The eighth piece or starboard upper cylinder section 451 also includes (see FIGS. 11 and 12) a top end wall 465 which extends from the wall means defining the cylindrical bores 467 and 459 and from the first surface 453 in general alignment with the top end wall 365 of the sixth piece or starboard middle cylinder section 351.

Still further in addition, the eighth piece or starboard upper cylinder section 451 includes (see FIG. 1) a third surface 471 which, in the assembly, is parallel to the first surfaces 103 and 153 of the first and second pieces 101 and 151 and co-planar to the third surfaces 341, 391, and 421 of the fifth, sixth and seventh pieces 301, 351 and 401 respectively.

Still further in addition, the eighth piece or starboard upper cylinder section 451 includes (see FIGS. 1 and 15) a fourth surface 475 which extends parallel to the first surfaces 103 and 153 of the first and second pieces 101 and 151, which is located in spaced, parallel, outwardly offset relation to the third surface 471, and in spaced relation to the second surface 455, and in coplanar relation to the fourth surface 425 of the seventh piece or port upper cylinder section 401.

Still further in addition, the eighth piece or starboard upper cylinder section 451 includes (see FIG. 12) a cavity or recess 481 which extends in the first surface 453 and from the cylindrical bores 457 and 459 to the third surface 471, and in registry with the cavity 393 in the sixth piece or starboard middle cylinder section 351 and which provides an exhaust passage wall 484 defining the remaining portion of the exhaust passage 67.

The cavity 481 includes branches 485 and 487 which respectively communicate with the cylindrical bores 457 and 459 through respective exhaust ports 489 and 491 which are sub-divided by a divider wall or partition 493. The cross sections of the exhaust ports 489 and 491 and of the cavity 481 in the eight piece or starboard upper cylinder section 451 increase in size toward the first surface 453 to facilitate separation of the eight piece or starboard upper cylinder section 451 and a forming die (not shown).

At their other ends, the branches 485 and 487 merge to form a common branch 495 which extends to the third surface 471 and which is also defined (see FIG. 15) by a wall portion 496 extending to the bottom end wall 461.

The wall means defining the cylinder cylindrical bores 457 and 459 also defines two circular cavities 498 and 499 which respectively surround the cylindrical bores 457 and 459. The cavities 498 and 499 form a portion of the water jacket space 71 and communicate, through bores, 499a extending parallel to the axis of the cylindrical bores 457 and 459, with portions of the water jacket space 71 formed by the sixth piece 351. The circular cavities 498 and 499 increase in size toward the second surface 455 to facilitate separation of the eight piece 451 and a forming die (not shown).

The lost foam pattern assembly 11 also includes (see FIGS. 1 and 16 through 18) a ninth piece or exhaust manifold or bridge section 501 which includes a first planar surface 511 which registers with and is glued to the third surfaces 341, 391, 421 and 471 of the fifth, sixth, seventh, and eighth pieces 301, 351, 401, and 451, respectively, and a second planar or bottom end wall surface 513 which registers with and is co-planar with the bottom end walls 411 and 461 of the seventh and eighth pieces 401 and 451, respectively. In addition, the ninth piece 501 includes wall means defining a pair of cavities 521 and 523 which complete the exhaust passages 57 and 67 and which are separated from each other by a partition 531 extending from the first surface 511. The partition 531 terminates in an end surface 533 spaced inwardly from the second surface or bottom end wall surface 513 so as to provide thereafter a single main exhaust passage which terminates in the generally rectangular exhaust outlet 19 in the bottom end 17, which outlet 19 is adapted for discharging exhaust gases into an adaptor or drive shaft housing (not shown) located below the resulting engine block.

The lost foam pattern assembly 11 also includes a tenth piece or exhaust manifold water jacket section 551 which includes (see FIGS. 1, 2 and 18) a first planar surface 561 which is glued or otherwise suitably fixed to the fourth surfaces 425 and 475 of the seventh and eighth pieces 401 and 451, together with a bottom end wall surface 563 which registers with and is co-planar with the bottom end wall surfaces 411 and 461 of the seventh and eighth pieces 401 and 451, and a top end wall 565 which registers with flat surfaces 571 and 572 on the end walls 415 and 465 of the seventh and eight pieces 401 and 451 and which is coplanar with surfaces 573, 574, 575 and 576 of the third, fourth, fifth, and sixth top end wall surfaces 211, 261, 311, 361, to complete the access port 33 which is located in the top end 31 of the pattern assembly 11 and in communication with the water jacket space 71.

Figure 18:
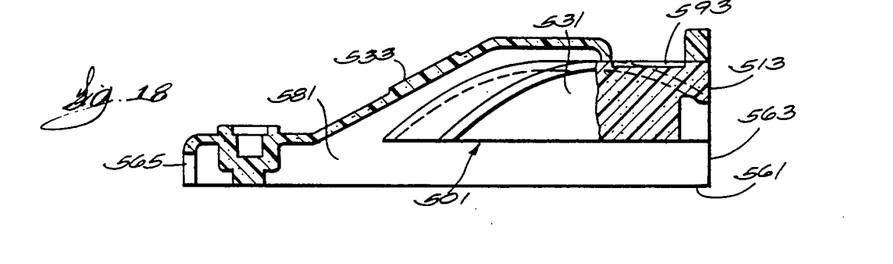
FIG. 18 is a view, partially in section and with parts omitted, taken along line 18—18 of FIG. 2.

The exhaust manifold water jacket piece or section 551 also includes wall means extending from the first planar surface 561 and between the bottom and top end walls 563 and 565 and defining a cavity 581 providing a cover wall 583 which, in general, is located in spaced relation to the ninth piece 501 and in covering relation to the otherwise open interior water jacket space 71. Preferably, the ninth and tenth pieces 501 and 551 respectively include, adjacent the bottom end walls 513 and 563, abutting bosses 591 and 593 which are glued or otherwise suitable affixed to each other, thereby strengthening the tenth piece 551 in relation to the remainder of the pattern assembly 11.

The fifth, sixth, seventh and eighth pieces 301, 351, 401, and 451 are provided with water jacket drain passages 701 and 751 which extend from the coolant drain ports 25 and 27 in the bottom end walls 311 and 361 of the fifth and sixth pieces 301 and 351 and which terminate in the ports 38 and 40 (see FIGS. 9 and 11) provided in the second surfaces 405 and 455 of the seventh and eighth pieces 401 and 451, which second surfaces 405 and 455, as already noted, form the cylinder head faces 37 and 39. The ports 38 and 40 are adapted to receive coolant water discharged from the cylinder heads (not shown).

The passages 701 and 751 extend interiorly in the fifth, sixth, seventh and eighth pieces 301, 351, 401, and 451 and include mating ports 703 and 705 (see FIGS. 8 and 9) in the fifth and seventh pieces 301 and 401 and mating ports 753 and 755 in the sixth and eighth pieces 351 and 451.

Each of the eight transfer passages 231, 233, 281 and 283 formed in the cylinders 51, 53, 61 and 63 is provided (see FIGS. 10 and 14) with a curved radially inwardly located wall 591 by respective inserts or pieces 593 which are received into the cavities 321, 323, 371 and 373 and located against movement by reason of such entry into spaced recesses formed in the transfer passage cavities as more fully explained in my co-pending U.S. application Ser. No. 202212 filed June 3, 1988 and entitled "Lost Foam Engine Block Pattern" which application is incorporated herein by reference. Preferably, the eight inserts or pieces 593 are glued in the associated eight transfer passage cavities 321, 323, 371 and 373.

The opening 29, provided in the bottom end 17, affords drainage of the water jacket space 71 in the cast engine block and, in the lost foam pattern, serves to advantageously avoid intersection of glue lines. Such glue line intersection is tolerated at the opening or port 33 in the upper or top end 31 of the pattern assembly 11.

In an alternative embodiment shown in FIG. 19, the first and third pieces 101 and 201 are fabricated by die casting in a single piece 801 and the second and fourth pieces 151 and 251 ar fabricated by die casting in a single piece 851. With such pieces 801 and 851, and referring to the pattern assembly top end 31, shown in FIG. 2, the pattern assembly 11 can be glued together without intersection, as in the FIG. 2 embodiment, of the glue plane defined by the surfaces 219 and 269 either with the glue plane defined by the surfaces 111 and 203 or with the glue plane defined by the surfaces 161 and 253.

Various of the features of the invention are set forth in the following claims.

I claim:

1. A lost foam pattern assembly comprising a crankcase section including first and second planar surfaces intersecting at an angle defined therebetween, a port cylinder section fixed to said first surface of said crankcase section, and a starboard cylinder section fixed to said second surface of said crankcase section, said port and starboard cylinder sections being fixed to each other along a glue face located in a plane bisecting said angle.

2. A lost foam pattern assembly comprising a port crankcase section including first and second surfaces extending at a right angle to each other, and a third surface extending in inclined relation to said first and second surfaces, a starboard crankcase section including first and second surfaces extending at a right angle to each other, and a third surface extending in inclined relation to said first and second surfaces of said starboard crankcase section, said first surfaces of said port and starboard crankcase sections being co-planar, said second surfaces of said port and starboard crankcase sections being fixed to each other along a first glue face, a port cylinder section fixed to said third surface of said port crankcase section, and a starboard cylinder section fixed to said third surface of said starboard crankcase section, said port and starboard cylinder sections being fixed to each other along a second glue face co-planar with said first glue face.

3. A lost foam pattern assembly in accordance with claim 2 wherein each of said port and starboard cylinder sections includes a lower cylinder piece, a middle cylinder piece, and an upper cylinder piece, and wherein said lower and middle cylinder pieces of said port and starboard cylinder sections are fixed to each other along said second glue face.

4. A lost foam pattern assembly in accordance with claim 3 wherein said middle and upper cylinder pieces of said port and starboard cylinder sections are fixed to each other along a third glue face.

5. A lost foam pattern assembly in accordance with claim 4 wherein said third glue face is co-planar to said first glue face.

6. A lost foam pattern assembly comprising a first piece including first and second surfaces extending at a right angle to each other, and a third surface extending in inclined relation to said first and second surfaces, a second piece including first and second surfaces extending at a right angle to each other and a third surface extending in inclined relation to said first and second surfaces of said second piece, said second surfaces of said first and second pieces being fixed to each other along a first glue line, and said first surfaces of said first and second pieces being co-planar, a third piece having a first surface fixed to said third surface of said first piece along a second glue line, a fourth piece having a first surface fixed to said third surface of said second piece along a third glue line, said second and third glue lines extending at a substantial angle to each other, and said first, second and third glue lines being free of intersection with one another.

7. A lost foam pattern assembly for a V-block multicylinder two stroke internal combustion engine, said pattern comprising a first piece having a first surface, an other surface in inclined relation to said first surface of said first piece, a cylindrical bore extending from said first surface of said first piece, and wall means defining a cavity extending in said first surface in said first piece and communicating with said bore in said first piece and extending to said other surface of said first piece and partially defining a first exhaust passage, a second piece having a first surface, an other surface in inclined relation to said first surface of said second piece and in co-planar relation to said other surface of said first piece, a cylindrical bore extending from said first surface of said second piece, and wall means defining a cavity extending in said first surface of said second piece and communicating with said bore in said second piece and extending to said other surface of said second piece and partially defining a second exhaust passage, a third piece including a first surface fixed to said first surface of said first piece, an other surface extending in inclined relation to said first surface of said third piece and in co-planar relation to said other surfaces of said first and second pieces, a cylindrical bore extending from said first surface of said third piece and in alignment with said cylindrical bore in said first piece, and wall means defining a cavity extending in said first surface of said third piece and communicating with said bore in said third piece and extending to said other surface of said third piece and partially defining said first exhaust passage, a fourth piece including a first surface fixed to said first surface of said second piece, an other surface in inclined relation to said first surface of said fourth piece and in co-planar relation to said other surfaces of said first, second, and third pieces, a cylindrical bore extending from said first surface of said fourth piece and in alignment with said cylindrical bore in said second piece, and wall means defining a cavity extending in said first surface of said fourth piece and communicating with said bore in said fourth piece and extending to said other surface of said fourth piece and partially defining said second exhaust passage, an exhaust manifold piece having a first surface fixed to said other surfaces of said first, second, third, and fourth pieces, and wall means defining a cavity extending in said first surface of said exhaust manifold piece and partially defining said first and second exhaust passages, and a water jacket cover piece having a first surface fixed to said third and fourth pieces, and a cover surface extending from said first surface of said water jacket piece and in spaced and covering relation to said exhaust manifold piece.

8. A lost foam pattern assembly in accordance with claim 7 wherein said first, second, third, fourth, exhaust manifold, and water jacket cover pieces respectively include co-planar end walls, wherein said end walls of said first and second pieces respectively define coolant drain ports, wherein said end walls of said first, second, third, fourth, and exhaust manifold pieces define an exhaust gas outlet communicating with said first and second exhaust gas passages, and wherein one of said end walls of said third piece and said fourth piece, and said exhaust manifold piece, and said water jacket cover piece define a water jacket inlet port.

9. A lost foam pattern assembly in accordance with claim 7 wherein said first piece includes a cavity forming the head end portion of a transfer passage communicating with said cylindrical bore in said first piece, and wherein said second piece includes a cavity forming the head end portion of a transfer passage communicating with said cylindrical bore in said second piece.

10. A lost foam pattern assembly in accordance with claim 7 wherein said third piece includes an additional surface parallel to said other surface of said third piece, wherein said fourth piece includes an additional surface parallel to said other surface of said fourth piece and in co-planar relation to said additional surface of said third piece, and wherein said first surface of said water jacket cover piece is fixed to said additional surfaces of said third and fourth pieces.

11. A lost foam pattern assembly for a V-block multi-cylinder two stroke internal combustion engine, said pattern comprising a first piece including first and second surfaces extending at a right angle to each other, and a third surface extending in inclined relation to said first and second surfaces, a second piece including first and second surfaces extending at a right angle to each other and a third surface extending in inclined relation to said first and second surfaces of said second piece, said second surfaces of said first and second pieces being fixed to each other and said first surfaces of said first and second pieces being co-planar, a third piece fixed to said first piece and having a first surface in parallel relation to said third surface of said first piece, an other surface in parallel relation to said first surface of said first piece, a cylindrical bore extending from said first surface of said third piece, and wall means defining a cavity extending in said first surface in said third piece, communicating with said bore in said third piece, extending to said other surface of said third piece, and partially defining a first exhaust passage, a fourth piece fixed to said second piece and having a first surface in parallel relation to said third surface of said second piece, an other surface in parallel relation to said first surface of said second piece and co-planar with said other surface of said third piece, a cylindrical bore extending from said first surface of said fourth piece, and wall means defining a cavity extending in said first surface of said fourth piece, communicating with said bore in said fourth piece, extending to said other surface of said fourth piece, and partially defining a second exhaust passage, a fifth piece including a first surface fixed to said first surface of said third piece, an other surface in parallel relation to said first surface of said first piece and in co-planar relation to said other surfaces of said third and fourth pieces, a cylindrical bore extending from said first surface of said fifth piece and in alignment with said cylindrical bore in said third piece, and wall means defining a cavity extending in said first surface of said fifth piece, communicating with said bore in said fifth piece, extending to said other surface of said fifth piece, and partially defining said first exhaust passage, a sixth piece including a first surface fixed to said first surface of said fourth piece, an other surface in parallel relation to said first surface of said second piece and in co-planar relation to said other surfaces of said third, fourth, and fifth pieces, a cylindrical bore extending from said first surface of said sixth piece and in alignment with said cylindrical bore in said fourth piece, and wall means defining a cavity extending in said first surface of said sixth piece, communicating with said bore in said sixth piece, extending to said other surface of said sixth piece, and partially defining said second exhaust passage, an exhaust manifold piece having a first surface fixed to said other surfaces of said third, fourth, fifth, and sixth pieces, and wall means defining a cavity extending in said first surface of said exhaust manifold piece and partially defining said first and second exhaust passages, and a water jacket cover piece having a first surface fixed to said fifth and sixth pieces, and a cover surface extending from said first surface of said water jacket piece and in spaced and covering relation to said exhaust manifold piece.

12. A lost foam pattern assembly in accordance with claim 11 wherein said third piece includes an additional surface extending at a right angle to said other surface of said third piece and in co-planar relation to said second surface of said first piece, and wherein said fourth piece includes an additional surface extending at a right angle to said other surface of said fourth piece and in co-planar relation to said second surface of said second piece and fixed to said additional surface of said third piece.

13. A lost foam pattern assembly in accordance with claim 11 wherein said first, second, third, fourth, fifth, sixth, exhaust manifold, and water jacket cover pieces respectively include co-planar ends walls, wherein said end walls of said third and fourth pieces respectively define a pair of coolant drain ports, wherein said end walls of said third, fourth, fifth, sixth, and exhaust manifold pieces define an exhaust gas outlet communicating with said first and second exhaust gas passages, and wherein said end walls of said fifth piece, said sixth piece, said exhaust manifold piece, and said water jacket cover piece define a pair of water jacket inlet ports.

14. A lost foam pattern assembly in accordance with claim 11 wherein said that piece includes a cavity forming the head end portion of a transfer passage communicating with said cylindrical bore in said third piece, and wherein said fourth piece includes a cavity forming the head end portion of a transfer passage communicating with said cylindrical bore in said fourth piece.

15. A lost foam pattern assembly in accordance with claim 11 wherein said fifth piece includes an additional surface parallel to said other surface of said fifth piece, wherein said sixth piece includes an additional surface parallel to said other surface of said sixth piece and in co-planar relation to said additional surface of said fifth piece, and wherein said first surface of said water jacket cover piece is fixed to said additional surfaces of said fifth and sixth pieces.

16. A lost foam pattern assembly for a V-block multi-cylinder two stroke internal combustion engine, said pattern comprising a port crankcase section including first and second surfaces extending at a right angle to each other, and a third surface extending in inclined relation to said first and second surfaces, a starboard crankcase section including first and second surfaces extending at a right angle to each other and a third surface extending in inclined relation to said first and second surfaces of said starboard crankcase section, said second surfaces of said port and starboard crankcase sections being fixed to each other and said first surfaces of said port and starboard crankcase sections being co-planar, a port lower cylinder section having a first surface fixed to said third surface of said port crankcase section, a second surface in spaced and parallel relation to said first surface of said port lower cylinder section, and a cylindrical bore extending between said first and second surfaces of said port lower cylinder section, a starboard lower cylinder section having a first surface fixed to said third surface of said starboard crankcase section, a second surface in spaced parallel relation to said first surface of said starboard lower cylinder section, and a cylindrical bore extending between said first and second surfaces of said starboard lower cylinder section, a port middle cylinder section having a first surface fixed to said second surface of said port lower cylinder section, a second surface in spaced parallel relation to said first surface of said port middle cylinder section, a third surface in inclined relation to said second surface of said port middle cylinder section, a cylindrical bore extending between said first and second surfaces of said port middle cylinder section and in alignment with said cylindrical bore in said port lower cylinder section, and wall means defining a cavity extending in said second surface in said port middle cylinder section and communicating with said bore in said port middle cylinder section and extending to said third surface of said port middle cylinder section and partially defining a first exhaust passage, a starboard middle cylinder section having a first surface fixed to said second surface of said starboard lower cylinder section, a second surface in spaced parallel relation to said first surface of said starboard middle cylinder section, a third surface in inclined relation to said second surface of said starboard middle cylinder section and co-planar with said third surface of said port middle cylinder section, a cylindrical bore extending between said first and second surfaces of said claim starboard middle cylinder section and in alignment with said bore in said starboard lower cylinder section, and wall means defining a cavity extending in said second surface of said starboard middle cylinder section and communicating with said bore in said starboard middle cylinder section and extending to said third surface of said starboard middle cylinder section and partially defining a second exhaust passage, a port upper cylinder section including a first surface fixed to said second surface of said port middle cylinder section, a second surface in spaced parallel relation to said first surface of said port upper cylinder section, a third surface in inclined relation to said second surface of said port upper cylinder section and in co-planar relation to said third surfaces of said port and starboard middle cylinder sections, a cylindrical bore extending between said first and second surfaces of said port upper cylinder section and in alignment with said cylindrical bore in said port middle cylinder section, and wall means defining a cavity extending in said first surface of said port upper cylinder section and communicating with said bore in said port upper cylinder section and extending to said third surface of said port upper cylinder section and partially defining said first exhaust passage, a starboard upper cylinder section including a first surface fixed to said second surface of said starboard middle cylinder section, a second surface in spaced parallel relation to said first surface of said starboard upper cylinder section, a third surface in inclined relation to said second surface of said starboard upper cylinder section and in co-planar relation to said third surfaces of said port and starboard middle cylinder sections and said port upper cylinder section, a cylindrical bore extending between said first and second surfaces of said starboard upper cylinder section and in alignment with said cylindrical bore in said starboard middle cylinder section, and wall means defining a cavity extending in said first surface of said starboard upper cylinder section and communicating with said bore in said starboard upper cylinder section and extending to said third surface of said starboard upper cylinder section and partially defining said second exhaust passage, an exhaust manifold section having a first surface fixed to said third surfaces of said port and starboard middle and upper sections, and wall means defining a cavity extending in said first surface of said claim exhaust manifold section and partially defining said first and second exhaust passages, and a water jacket cover section having a first surface fixed to said port and starboard upper cylinder sections, and a cover surface extending from said first surface of said water jacket section and in spaced and covering relation to said exhaust manifold section.

17. A lost foam pattern assembly in accordance with claim 16 wherein said port lower cylinder section includes an additional surface in co-planar relation to said second surface of said port crankcase section, and wherein said starboard lower cylinder section includes an additional surface in co-planar relation to said second surface of said starboard crankcase section and fixed to said additional surface of said port lower cylinder section.

18. A lost foam pattern assembly in accordance with claim 16 wherein said port middle cylinder section includes an additional surface in co-planar relation to said second surface of said port crankcase section, and wherein said starboard middle cylinder section includes an additional surface in co-planar relation to said second surface of said starboard crankcase section and fixed to said additional surface of said port middle cylinder section.

19. A lost foam pattern assembly in accordance with claim 16 wherein said port lower cylinder section includes an additional surface in co-planar relation to said second surface of said port crankcase section, wherein said starboard lower cylinder section includes an additional surface extending in co-planar relation to said second surface of said starboard crankcase section and fixed to said additional surface of said port lower cylinder section, wherein said port middle cylinder section includes an additional surface in co-planar relation to said second surface of said port crankcase section, and wherein said starboard middle cylinder section includes an additional surface in co-planar relation to said second surface of said starboard crankcase section and fixed to said additional surface of said port middle cylinder section.

20. A lost foam pattern assembly in accordance with claim 16 wherein said port and starboard lower, middle and upper sections, and said water jacket section respectively include co-planar end walls cooperating to define therebetween an opening.

21. A lost foam pattern assembly in accordance with claim 16 wherein said port and starboard crankcase sections, said port and starboard lower, middle, and upper cylinder sections, said exhaust manifold section, and said water jacket cover section respectively include co-planar end walls, wherein said end walls of said port and starboard middle cylindrical sections respectively define a pair of coolant drain ports, wherein said end walls of said port and starboard middle and upper sections, and said exhaust manifold section define an exhaust gas outlet communicating with said first and second exhaust gas passages, and wherein said end walls of said port and starboard upper cylinder sections, said exhaust manifold section, and said water jacket cover section define a pair of water jacket inlet ports.

22. A lost foam pattern assembly in accordance with claim 16 wherein said port middle cylinder section includes a cavity forming the head end portion of a transfer passage communicating with said cylindrical bore in said port middle cylinder section, and wherein said port lower cylinder section includes a cavity forming the crankcase end portion of a transfer passage communicating with said cylindrical bore in said port lower cylinder section and aligned with said cavity in said port middle cylinder section.

23. A lost foam pattern assembly in accordance with claim 16 wherein said port upper cylinder section includes a fourth surface parallel to said third surface of said port upper cylinder section, wherein said starboard upper cylinder section includes a fourth surface parallel to said third surface of said starboard upper cylinder section and in co-planar relation to said fourth surface of said port upper cylinder section, and wherein said first surface of said water jacket cover section is fixed to said fourth surfaces of said port and starboard upper cylinder sections.

24. A lost foam pattern assembly comprising a first piece including a planar surface, a cylindrical bore extending from said planar surface, and a first cavity communicating with said cylindrical bore and with said first planar surface, and a second piece including a planar surface fixed to said planar surface of said first piece, a cylindrical bore extending from said planar surface of said second piece and in registry with said cylindrical bore of said first piece, a cavity communicating with said cylindrical bore of said second piece and with said planar surface of said second piece and in registry with said cavity of said first piece, and another cavity having an end in spaced relation to said planar surface of said second piece, communicating with said cylindrical bore of said second piece, and extending from said end in the direction away from said first piece.

25. A lost foam pattern assembly comprising a crankcase section including first and second surfaces, a port cylinder section fixed to said first surface of said crankcase section, and a starboard cylinder section fixed to said second surface of said crankcase section.

26. An assembly as set forth in claim 25 wherein said port and starboard cylinders sections are fixed to each other.

27. An assembly as set forth in claim 26 and further comprising a bridge section fixed to both of said port and starboard cylinder sections.

28. An assembly as set forth in claim 27 and further comprising a second port cylinder section fixed to said first mentioned port cylinder section, and a second starboard cylinder section fixed to said first mentioned starboard cylinder section, sand wherein said bridge section is fixed to both of said second port cylinder section and said second starboard cylinder section.

29. An assembly as set forth in claim 28 wherein said bridge section is an exhaust manifold section.

30. An assembly as set forth in claim 25 wherein said first and second surfaces are planar and intersect at an angle defined therebetween.

31. An assembly as set forth in claim 30 wherein said crankcase section includes port and starboard crankcase sections fixed to either other along a glue face located in a plane bisecting said angle.

32. A method for casting an engine block in a lost foam casting process, said method comprising the steps of providing a foam pattern assembly comprising a crankcase section including first and second planar surfaces intersecting at an angle defined therebetween, a port cylinder section fixed to said first surface of said crankcase section, and a starboard cylinder section fixed to said second surface of said crankcase section, said port and starboard cylinder sections being fixed to each other along a glue face located in a plane bisecting said angle, and utilizing said foam pattern assembly in a lost foam casing process to form an engine block.

33. A method for casting an engine block in a lost foam casting process, said method comprising the steps of providing a foam pattern assembly comprising a first piece including a planar surface, a cylindrical bore extending from said planar surface, and a first cavity communicating with said cylindrical bore and with said first planar surface, and a second piece including a planar surface fixed to said planar surface of said first piece, a cylindrical bore extending from said planar surface of said second piece and in registry with said cylindrical bore of said first piece, a cavity communicating with said cylindrical bore of said second piece and with said planar surface of said second piece and in registry with said cavity of said first piece, and another cavity having an end in spaced relation to said planar surface of said second piece, communicating with said cylindrical bore of said second piece, and extending from said end in the direction away from said first piece, and utilizing said foam pattern assembly in a lost foam casting process to form an engine block.

34. A method for casting an engine block in a lost foam casting process, said method comprising the steps of providing a foam pattern assembly comprising a crankcase section including first and second surface, a port cylinder section fixed to said first surface of said crankcase section, and a starboard cylinder section fixed to said second surface of said crankcase section, and utilizing said foam pattern assembly in a lost foam casting process to form an engine block.

* * * * *